United States Patent [19]

Yamada et al.

[11] Patent Number: 5,084,500
[45] Date of Patent: Jan. 28, 1992

[54] THERMOFORMABLE VINYLIDENE CHLORIDE RESIN COMPOSITION AND RESIN LAMINATE COMPRISING THIS RESIN COMPOSITION

[75] Inventors: Muneki Yamada, Fujisawa; Fumio Kano, Yokohama, both of Japan

[73] Assignee: Toyo Seikan Kaisha Ltd., Tokyo, Japan

[21] Appl. No.: 210,583

[22] PCT Filed: Sep. 4, 1987

[86] PCT No.: PCT/JP87/00659
§ 371 Date: Jul. 5, 1988
§ 102(e) Date: Jul. 5, 1988

[87] PCT Pub. No.: WO88/01632
PCT Pub. Date: Mar. 10, 1988

[30] Foreign Application Priority Data
Sep. 5, 1986 [JP] Japan .............. 61-208005

[51] Int. Cl.$^5$ .............................................. C08K 3/32
[52] U.S. Cl. .............................. 524/417; 524/287; 524/568; 524/114
[58] Field of Search ............. 524/287, 417, 568, 114

[56] References Cited

U.S. PATENT DOCUMENTS

| | | | |
|---|---|---|---|
| 3,513,226 | 5/1970 | Hotta | 524/114 |
| 4,127,633 | 11/1978 | Addleman . | |
| 4,132,691 | 1/1979 | Ejk | 524/436 |

FOREIGN PATENT DOCUMENTS 661803 11/1951 United Kingdom ............ 524/287

OTHER PUBLICATIONS

S. Krimm and C. Y. Liang, J. of Polymer Science, vol. XXII, pp. 95–112 (1956).
Ronald H. Faster, Polymers, Laminations and Coating Conference, pp. 437–461 (1984).

*Primary Examiner*—Joseph L. Schofer
*Assistant Examiner*—Peter Mulcahy
*Attorney, Agent, or Firm*—Sughrue, Mion, Zinn Macpeak & Seas

[57] ABSTRACT

A vinylidene chloride resin comprising (A) 90 to 99% by weight of vinylidene chloride and 1 to 10% by weight of an acrylic or methacrylic monomer is mixed with (B) 0.5 to 5% by weight, based on the resin, of a low-molecular-weight or high-molecular-weight plasticizer and (C) 0.2 to 5% by weight, based on the resin, of a condensed phosphoric acid salt. Even if this resin composition is exposed to high temperatures, thermal decomposition of the vinyl chloride resin is prominently controlled. When this vinylidene chloride resin composition is laminated with a thermoplastic resin having a thermoforming temperature higher than the thermoforming temperature of the vinylidene chloride resin, a packaging resin laminate having an excellent gas-barrier property is obtained.

9 Claims, No Drawings

THERMOFORMABLE VINYLIDENE CHLORIDE RESIN COMPOSITION AND RESIN LAMINATE COMPRISING THIS RESIN COMPOSITION

TECHNOLOGICAL FIELD

The present invention relates to a thermoformable vinylidene chloride resin composition. More particularly, the present invention relates to a vinylidene chloride resin composition in which decomposition foaming or discoloration is controlled at the forming step and which has an excellent gas permeability and is valuable as a material for the production of a packaging material. Moreover, the present invention relates to a resin laminate comprising this resin composition.

PRIOR ART

A vinylidene chloride resin has an excellent oxygen barrier property, and among various oxygen barrier resins, a vinylidene chloride resin has an extremely low water vapor permeability and the humidity dependency of the oxygen permeability of this resin is extremely small. Therefore, a vinylidene chloride resin is widely used as a gas insulating packaging material.

In the case where the vinylidene chloride resin is used in the field of packaging materials, an aqueous latex of the vinylidene chloride resin is used in the formation of a package because the vinylidene chloride resin is easily thermally decomposed. One example is where a latex of vinylidene chloride resin is coated on a finished formed body of another resin (see, for example, the specification of U.S. Pat. No. 4,370,368). Another example is where an aqueous latex of a vinylidene chloride resin is coated on a polyester preform (parison) for draw blow forming of a polyester bottle (see the specification of U.S. Pat. No. 4,393,106).

It is known that a vessel such as a bottle can be prepared by thermoforming a vinylidene chloride resin, and, for example, the specification of U.S. Pat. No. 4,041,235 teaches that a vinylidene chloride copolymer containing 0.5 to 10% by weight of glycidyl methacrylate as an internal heat stabilizer can be extruded into a parison and the parison blow formed into a bottle. Furthermore, the specification of U.S. Pat. No. 4,123,477 teaches that a film having excellent transparency and an excellent gas barrier property is prepared by the inflation film-forming process from a resin composition comprising 100 parts by weight of a copolymer comprising 75 to 95% by weight of vinylidene chloride and 5 to 25% by weight of a comonomer and 3 to 60 parts by weight of a chlorinated ethylene/vinyl ester copolymer.

Use of a vinylidene chloride resin in the form of an aqueous latex for the production of a packaging material is not advantageous from the economical viewpoint, because troublesome operations such as coating and drying are necessary and a large quantity of heat energy is necessary for evaporation and removal of water.

A resin composition formed by incorporating a low molecular weight or high molecular weight lubricant at a high concentration into a vinylidene chloride resin can resist thermoforming conducted at a relatively low temperature such as 170° to 180° C., but at extrusion molding or injection molding conducted at higher temperatures, foaming or discoloration is caused by a dehydrohalogenating thermal decomposition, and the inherent gas barrier property thereof is lost.

In the case where a multi-layer laminate formed by combining a vinylidene chloride resin as a gas barrier layer with other resin is used as a packaging material, simultaneous melt extrusion molding of the vinylidene chloride resin with another resin, or co-injection molding or sequential injection of the vinylidene chloride resin with another resin, becomes necessary. Accordingly, the vinylidene chloride resin layer is exposed to the high temperature possessed by the other resin, and, therefore, the above mentioned problems such as foaming, discoloration and a reduction of mechanical properties are encountered.

Incorporation of a large quantity of a plasticizer for imparting a low temperature thermoformability capability to a vinylidene chloride resin is not preferred, because the gas barrier property of the final packaging material is degraded and, especially, the gas barrier property of the final packaging material after retort sterilization is drastically degraded, and therefore, it is preferred that the amount of the plasticizer incorporated be controlled to a level as low as possible.

SUMMARY OF THE INVENTION

It is therefore the subject matter of the present invention to provide a thermoformable vinylidene chloride resin composition in which foaming, discoloration and a reduction of mechanical properties due to thermal decomposition are controlled, even if the composition is exposed to a high temperature, and which is therefore used advantageously for the production of a packaging resin laminate.

The present inventors found that in a resin composition comprising (A) a vinylidene chloride resin comprising 90 to 99% by weight of vinylidene chloride and 1 to 10% by weight of an acrylic or methacrylic monomer, (B) 0.5 to 5% by weight, based on the resin, of a low molecular weight or high molecular weight plasticizer and (C) 0.2 to 5% by weight, based on the resin, of a condensed phosphoric acid salt, thermal decomposition is highly controlled, even on exposure to high temperatures.

The present inventors also found that when this vinylidene chloride resin composition is used for lamination with a thermoplastic resin having a thermoforming temperature higher than the thermoforming temperature of the vinylidene chloride resin, a packaging resin laminate having an excellent gas barrier property is obtained.

The present invention is based on the finding that when a condensed phosphoric acid such as sodium tripolyphosphate is incorporated, together with a small amount of a plasticizer, into a thermoformable vinylidene chloride resin, even if the resulting composition is exposed to a high temperature, thermal decomposition is controlled and foaming, discoloration or other deterioration an be effectively prevented.

Thermal decomposition of a vinylidene chloride resin is the dehydrochlorination of the polymer chain, which is an autocatalytic reaction in which hydrogen chloride formed by thermal decomposition acts as a catalyst for the decomposition. Moreover, if a minute amount of a metal such as iron, zinc or chromium is present, the metal acts as a catalyst for this decomposition reaction.

In the present invention, the condensed phosphoric acid salt exerts a function of controlling thermal decomposition of the vinylidene chloride resin at high temperatures. It is believed that this function is due to the fact that the condensed phosphoric acid salt effectively traps hydrogen chloride isolated from the vinylidene chloride resin and controls the chain transfer in the dehydrochlorination of the vinylidene chloride resin, and the condensed phosphoric acid salt sequesters metals incorporated from a kneader, a mold or the like.

The vinylidene chloride resin used in the present invention comprises 90 to 99% by weight, especially 92 to 98% by weight, of vinylidene chloride and 1 to 10% by weight, especially 2 to 8% by weight, of an acrylic or methacrylic monomer. This feature is important for maintaining a good balance between thermoformability and the barrier property for various gases. Namely, if the amount of the comonomer is smaller than the lower limit of the above range, thermoforming becomes difficult, and if the amount of the comonomer exceeds the upper limit of the above range, the gas barrier property is degraded. The kind of the comonomer is important from the viewpoint of the gas barrier property. When vinyl chloride or some other vinyl monomer is used, the gas barrier property is insufficient.

A low molecular weight or high molecular weight plasticizer is incorporated in the resin composition of the present invention for maintaining good melt formability. One of the characteristic features of the resin composition of the present invention is that the content of the plasticizer is relatively low, and is 0.5 to 5% by weight, especially 1 to 3% by weight, based on the vinylidene chloride resin. Therefore, the trend toward reduction of the gas barrier property by the presence of the plasticizer can be controlled. This reduction of the amount of the plasticizer can be attained by incorporation of the condensed phosphoric acid salt into the vinylidene chloride composition. The condensed phosphoric acid salt is incorporated in an amount of 0.2 to 5% by weight, especially 0.5 to 3% by weight, based on the vinylidene chloride resin. If the amount of the condensed phosphoric acid salt is smaller than the lower limit of the above range, foaming, discoloration and reduction of physical properties by thermal decomposition can hardly be avoided. If the amount of the condensed phosphoric acid salt exceeds the upper limit of the above range, no particular effect is attained with respect to the heat stability but because of the hygroscopic property of the condensed phosphoric acid salt, the gas barrier property is adversely influenced.

Due to the foregoing functions, according to the present invention foaming, discoloration and a reduction of physical properties by thermal decomposition on exposure to high temperatures are highly controlled, and melt formabillity can be maintained with a reduced amount of the incorporated plasticizer and a packaging resin formed article excellent in the barrier property to various gases can be easily obtained by melt forming. Moreover, if the vinylidene chloride resin composition of the present invention is used, lamination with other thermoplastic resins having a thermoforming temperature higher than the thermoforming temperature of the vinylidene chloride resin can be advantageously performed without thermal deterioration of the vinylidene chloride resin.

PREFERRED EMBODIMENTS OF THE INVENTION

Condensed phosphoric acid salt

As the condensed phosphoric acid salt, there can be mentioned salts, especially alkali metal salts, in which phosphoric radicals are connected linearly or in a ring. As the linear condensed phosphoric acid salts, there can be mentioned condensed phosphoric acid salts represented by the following formula:

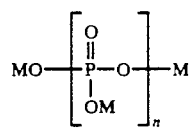

(1)

wherein

M stands for an alkali metal, especially sodium or potassium, and n is a number of at least 2, such as pyrophosphoric acid salts, tripolyphosphoric acid salts and tetrapolyphosphoric acid salts. As the cyclic condensed phosphoric acid salts, there can be mentioned condensed phosphoric acid salts represented by the following formula:

$$(MPO_3)_m \qquad (2)$$

wherein

M is as defined above, and m is a number of at least 3, such as trimetaphosphoric acid salts, tetrametaphosphoric acid salts and hexametaphorphoric acid salts. Potassium metaphosphate and sodium metaphosphate include a variety of salts ranging from salts having a low molecular weight to salts having such a high molecular weight such as $1 \times 10^4$ or more, for example, Kurrol's salt and Graham's salt. Any of these salts can be used for attaining the object of the present invention.

In view of the dispersibility of the condensed polyphosphoric acid salt in the vinylidene chloride resin, it is preferred that the condensed phosphoric acid salt be used in the form of a fine powder having an average particle size of 5 to 80 μm, especially 10 to 30 μm.

Vinylidene chloride resin

The vinylidene chloride resin used in the present invention is a copolymer comprising 90 to 99% by weight, especially 92 to 98% by weight, of vinylidene chloride and 1 to 10% by weight, especially 2 to 8% by weight, of an acrylic or methacrylic monomer. As the acrylic or methacrylic monomers, there can be mentioned monomers represented by the following formula:

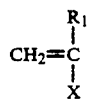

(3)

wherein $R_1$ stands for a hydrogen atom or a methyl group and X stands for a nitrile group (—C≡N) or a group

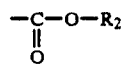

(in which $R_2$ is an organic group).

As preferred examples, there can be mentioned acrylonitrile, methacrylonitrile, methyl acrylate, ethyl acrylate, butyl acrylate, 2-hydroxyethyl acrylate, glycidyl acrylate, methyl methacrylate, ethyl methacrylate, 2-hydroxypropyl methacrylate, glycidyl methacrylate, β-methoxyethyl methacrylate and β-aminoethyl methacrylate, though monomers that can be used in the present invention are not limited to those mentioned above.

As the vinylidene chloride resin especially preferable for attaining the object of the present invention, there can be mentioned (i) a copolymer of vinylidene chloride with at least one monomer selected from the group consisting of acrylic acid esters and methacrylic acid esters, and (ii) a copolymer of vinylidene chloride with at least one monomer selected from the group consisting of acrylic acid esters and methacrylic acid esters and at least one monomer selected from the group consisting of acrylonitrile and methacrylonitrile.

The molecular weight of the vinylidene chloride resin is not particularly critical, so long as the vinylidene chloride resin has a film-forming molecular weight. It is preferred that under conditions of a temperature of 20° C. and a relative humidity of 100%, the oxygen permeation coefficient of the vinylidene chloride resin be smaller than $9 \times 10^{-14}$ cc·cm/cm$^2$·sec·cmHg and the water vapor permeation coefficient (JIS Z-0208) be smaller than $3 \times 10^{-3}$ g·cm/m$^2$·day.

Plasticizer

In the present invention, in order to impart melt formability to the vinylidene chloride resin, a low molecular weight plasticizer and/or a high molecular weight plasticizer is incorporated into the vinylidene chloride resin. As the low molecular weight plasticizer, there are preferably used epoxy type plasticizers such as epoxidized soybean oil, epoxidized castor oil, epoxidized linseed oil, epoxidized safflower oil, epoxidized butyl linseed fatty acid ester, epoxidized methyl stearate, epoxidized butyl stearate and epoxidized octyl stearate. However, phthalic acid ester type plasticizers, adipic, sebacic or azelaic acid diester type plasticizers, phosphoric acid ester type plasticizers, hydroxy polyvalent carboxylic acid ester type plasticizers, fatty acid ester type plasticizers, polyhydric alcohol type plasticizers and polyester type plasticizers may be used singly or in combination with epoxy type plasticizers.

As the high molecular weight plasticizer, that is, the melt forming assistant, an ethylene/vinyl ester copolymer, especially an ethylene/vinyl acetate copolymer, is preferred. An ethylene/vinyl acetate copolymer having an ethylene content of 50 to 95% by weight, especially 65 to 90% by weight, a vinyl acetate content of 5 to 50% by weight, especially 10 to 35% by weight, and a melt flow rate (MFR) of 0.2 to 20 g/10 min, especially 1 to 10 g/10 min, is most preferred. Furthermore, a copolymer of ethylene with an acrylic acid ester or methacrylic acid ester, or oxidized polyethylene which has a melt flow rate (MFR) within the above-mentioned range, can be used.

One of the low molecular weight plasticizer and the high molecular weight plasticizer can be used, but it is generally preferred that both types of the plasticizers be used in combination.

The weight ratio of the low molecular weight plasticizer (B-1) to the high molecular weight plasticizer (B-2) can be changed within a broad range, but it is generally preferred that both plasticizers be used at a (B-1)/(B-2) weight ratio of from 100/5 to 100/400, especially from 100/30 to 100/300.

Composition

According to the present invention, the above mentioned vinylidene chloride resin (A), low molecular weight or high molecular weight plasticizer (B) and condensed phosphoric acid salt (C) are mixed at the above mentioned mixing ratios to form a composition for forming a packaging material. More specifically, these components are dry blended by using a mixing machine such as a ribbon blender, a conical blender or a Henschel mixer, and the dry blend can be directly supplied to a melt kneading device of an extruder or a melt kneading device of an injection machine. Alternatively, the above components can be melt kneaded and formed into pellets in advance by a Banbury mixer, a kneader, a roll or an extrusion type pelletizer.

Known additives such as lubricants, other heat stabilizers, colorants, fillers and antioxidants can be incorporated according to known recipes into the resin composition of the present invention, if desired.

The vinylidene chloride resin composition of the present invention can be solely used for the production of packaging vessels. Namely, the resin composition can be formed into various film vessels, cup shaped vessels and tray shaped vessels by extruding the resin composition into a film or sheet and, if necessary, subjecting the film or sheet to plug assisted forming, air pressure forming, vacuum forming or press forming. Furthermore, a hollow vessel such as a bottle or tank can be obtained by extruding the resin composition into a cylinder and blow forming the cylinder in a split mold. Moreover, a vessel having a wall which is biaxially molecularly oriented can be obtained by injection molding the resin composition into a bottomed parison and biaxially draw forming the parison.

Laminate

As pointed out hereinbefore, the vinylidene chloride resin composition of the present invention is characterized by the fact in that thermal deterioration is highly controlled even at high temperatures. By utilizing this property, the vinylidene chloride resin composition of the present invention can be used for the production of a resin laminate comprising a vinylidene chloride resin layer as a gas barrier layer.

As the resin having a thermoforming temperature higher than the thermoforming temperature of the vinylidene chloride resin, there can be mentioned olefin resins having a excellent heat resistance, such as polypropylene, a crystalline propylene/ethylene copolymer and a crystalline propylene/butene-1 copolymer, aromatic polyesters such as polyethylene terephthalate and poly(bisphenol A terephthalate/isophthalate), polycarbonates and polyamides.

The resin laminate can be prepared according to known customary procedures, except that the above mentioned vinylidene chloride resin composition is used. For example, a layer of the vinylidene chloride resin (PVDC) and a layer of the high melting point resin (HMR) are simultaneously melt extruded, if necessary together with an intermediate layer of an adhesive (AD), through a multi-layer multi-ply die to obtain a multi-layer film, sheet, pipe or parison. In the formed multi-layer structure, the vinylidene chloride resin composition forms a gas barrier layer and the high melting point resin acts as a stress support. Even if the vinylidene chloride resin composition is exposed to extremely high temperatures in the multi-layer multi-ply die, thermal decomposition is not caused but an excellent gas barrier property can be maintained.

Preferred examples of the laminate structure are described below, though laminate structures that can be used are not limited to those exemplified below.

Two resin/two layer structure
PVDC/HMR
Two resin/three layer structure
HMR/PVDC/HMR
Three resin/three layer structure
PVDC/AD/HMR
Three resin/five layer structure
HMR/AD/PVDC/AD/HMR
Three resin/eight layer structure
HMR/AD/PVDC/AD/HMR/AD/PVDC/AD/HMR
Four resin/six layer structure
HMR/(HMR+PVCD+AD)/(AD/PVDC/AD/HMR)

As the adhesive layer, there can be used an ethylene/vinyl acetate copolymer, an ethylene/acrylic acid ester copolymer, an ionomer and an acid or acid anhydride modified propylene type polymer for the propylene type resin layer, and there can be used a copolyester hot adhesive for the polyester layer.

The multi-layer sheet can be punched into an appropriate shape and formed into a multi-layer cup shaped or tray shaped vessel by plug assisted forming or press forming. The multi-layer parison can be formed into a hollow vessel such as a bottle by blow forming the parison in the molten state in a split mold. Furthermore, the multi-layer pipe can be formed into a biaxially drawn vessel by closing one end of the multi-layer pipe to obtain a bottomed preform, stretch drawing the preform in the axial direction at the drawing temperature and simultaneously expansion drawing the preform in the circumferential direction.

From the viewpoint of the gas barrier property, it is preferred that in the thus obtained multi-layer vessel, the thickness of the vinylidene chloride resin layer is 5 to 400 μm, especially 10 to 300 μm. The thickness of the high melting point resin layer is changed according to the kind of the resin or whether or not the resin is molecularly oriented, but it is preferred that the thickness of the high melting point resin layer be 50 to 5000 μm, especially 100 to 4000 μm.

The resin laminate can also be prepared according to the multi-layer injection method. For example, there can be used a process in which a number, corresponding to the number of the kinds of the resins, of injection cylinders are used and a multi-layer resin flow is injected into an injection mold through a multi-layer multi-ply orifice, and a process in which the high melting point resin is injected into the midway of a cavity in an injection mold and the vinylidene chloride resin composition is injected as an intermediate layer, whereby a multi-layer container or a preform for formation of a multi-layer container can be obtained.

The vinylidene chloride resin composition of the present invention shows excellent heat resistance in a melting heat treatment for molding, a heat treatment for drawing and a heat treatment for orientation and fixation. Moreover, the vinylidene chloride resin composition of the present invention can sufficiently resist heat treatments for sterilizing the contents to be filled in a container, such as a retort sterilization treatment, a thermofilling treatment and a germ free filling treatment.

EXAMPLES 1 THROUGH 4 AND COMPARATIVE EXAMPLES 1 THROUGH 10

A composition comprising amounts (% by weight), shown in Table 1, of a vinylidene chloride/methyl acrylate copolymer resin (PVDC) having a methyl acrylate content of 7% by weight, epoxidized soybean oil (ESO), an ethylene/vinyl acetate copolymer resin (EVA) having a vinyl acetate content of 35% by weight and anhydrous sodium pyrophosphate (TSPP) having an average particle size of 30 microns was formed into a film having a thickness of 30 μm by a film forming apparatus comprising an extruder having a screw diameter of 50 mm, a T die, two vertical chill rolls and a take up device. In this film forming operation, the temperature of the extruder was set so that the resin extruded from the T die was maintained at a temperature as shown in Table 1.

With respect to each of the resin compositions shown in Table 1, the film forming property, the yellowing degree (JIS K-7103-1970) of the obtained film, the oxygen gas permeation coefficient of the film at a temperature of 23° C. and a relative humidity of 60% and the oxygen gas permeation coefficient of the film after treatment with steam at 120° C. for 30 minutes in a high temperature high pressure kettle were determined. The obtained results are shown in Table 1.

TABLE 1

| | Amounts (% by weight) of Additives | | | Extruded Resin Temperature (°C.) | Film Forming Property | Yellowing Degree (YI) | Oxygen Gas Permeation Coefficient × $10^{12}$ (cc · cm/cm$^2$ · sec · cmHg · 23° C.) | |
|---|---|---|---|---|---|---|---|---|
| | ESO | EVA | TSPP | | | | extruded film | film treated with steam at 120° C. |
| Example 1 | 2 | 2 | 2 | 175 | good | 0.30 | 0.049 | 0.050 |
| Example 2 | 2 | 2 | 1 | " | good | 0.35 | 0.046 | 0.046 |
| Example 3 | 2 | 2 | 3 | " | good | 0.28 | 0.052 | 0.053 |
| Comparative Example 1 | 2 | 2 | 0.1 | " | foaming and scorching | 25.3 | * | * |
| Comparative Example 2 | 2 | 2 | 7 | " | good | 0.30 | 0.075 | 0.32 |
| Comparative Example 3 | 0.3 | 0.1 | 2 | " | foaming and scorching | 35.0 | * | * |
| Comparative Example 4 | 2 | 5 | 2 | " | good | 0.30 | 0.074 | 0.48 |
| Comparative Example 5 | 0.1 | 0.3 | 2 | " | foaming and scorching | 40.1 | * | * |
| Example 4 | 2 | 2 | 2 | 190 | good | 4.8 | 0.050 | 0.051 |
| Comparative Example 6 | 2 | 2 | 0.1 | " | extrusion impossible by thermal decomposition | — | — | — |
| Comparative | 0.3 | 0.1 | 2 | " | extrusion impossible by | — | — | — |

TABLE 1-continued

| | Amounts (% by weight) of Additives | | | Extruded Resin Temperature (°C.) | Film Forming Property | Yellowing Degree (YI) | Oxygen Gas Permeation Coefficient × 10¹² (cc · cm/cm² · sec · cmHg · 23° C.) | |
|---|---|---|---|---|---|---|---|---|
| | ESO | EVA | TSPP | | | | extruded film | film treated with steam at 120° C. |
| Example 7 Comparative Example 8 | 0.1 | 0.3 | 2 | " | thermal decomposition extrusion impossible by thermal decomposition | — | — | — |
| Comparative Example 9 | 6 | 0.3 | 2 | " | good | 5.2 | 0.85 | 1.0 |
| Comparative Example 10 | 0.3 | 6 | 4 | " | good | 4.9 | 0.90 | 1.5 |

Note
*oxygen gas permeability could not be measured due to foaming

EXAMPLE 5

A sheet having a symmetric three resin/five layer structure (PP/AD/PVDC/AD/PP) and a total thickness of 0.8 mm (thickness ratio=43/3/8/3/43) was formed by the co-extrusion method using the vinylidene chloride resin composition (PVDC) used in Example 1 as the intermediate layer, an ethylene/vinyl acetate copolymer having a melt flow rate of 1.0 g/10 min and a vinyl acetate content of 36% by weight as the adhesive layer (AD) and isotactic polypropylene (PP) having a melt flow rate of 0.5 g/10 min as the inner and outer surface layers. The temperatures of the three extruders used were set so that the extrusion temperature for the vinylidene chloride resin was 175° C., the extrusion temperature for the adhesive resin was 192° C., and the extrusion temperature for the polypropylene was 225° C.

In the formed sheet, foaming or scorching due to decomposition of the vinylidene chloride resin layer was not observed at all, and the oxygen gas permeation constant of the sheet was $4.3 \times 10^{-14}$ cc·cm/cm²·sec·cmHg as determined at a temperature of 23° C.

COMPARATIVE EXAMPLES 11, 12 AND 13

Formation of a sheet was tried in the same manner as described in Example 5 except that the vinylidene chloride resin composition used in Comparative Example 1, 3 or 5 was used instead of the vinylidene chloride resin used in Example 4. In each case, yellowing (yellowing degree higher than 60) was caused within 10 to 20 minutes from the point of initiation of the extrusion, and after the passage of 30 minutes, scorching and foaming were cause due to thermal decomposition and forming of sheet became impossible.

What is claimed is:

1. A thermoplastic vinylidene chloride resin composition comprising (A) a vinylidene chloride resin comprising 90 to 99% by weight of vinylidene chloride and 1 to 10% by weight of an acrylic or methacrylic monomer, (B) 0.5 to 5% by weight, based on the resin, of combined plasticizers of an epoxy plasticizer (B-1) and an ethylene/vinyl acetate copolymer (B-2), and (C) 0.2 to 5% by weight, based on the resin, of a condensed phosphoric acid salt, wherein said epoxy type plasticizer (B-1) and said ethylene/vinyl acetate copolymer are present at a (B-1)/(B-2) weight ratio of from 100/5 to 100/400.

2. The resin composition of claim 1 wherein the condensed phosphoric acid salt is an alkali metal salt of condensed phosphoric acid in which the phosphoric acid radical is linked linearly or cyclically.

3. The resin composition of claim 1, wherein the condensed phosphoric acid salt is represented by the following formula:

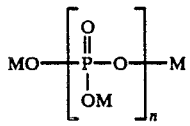

wherein
M stands for an alkali metal and
n is a number of at least 2.

4. The resin composition of claim 3 wherein the linear condensed phosphate is a pyrophosphate, tripoyphosphate or tetrapolyphosphate.

5. The resin composition of claim 2 wherein the cyclic condensed phosphate is represented by the following general formula $(MPO_3)_m$ wherein
M represents an alkali metal, especially sodium or potassium, and
m is a number of at least 3.

6. The resin composition of claim 2 wherein the cyclic condensed phosphate is a trimetaphosphate, a tetrametaphosphate or hexamethaphosphate.

7. The resin composition of any one of claims 2 to 6 wherein the condensed phosphate is used in the form of a fine powder having an average particle diameter of 5 to 80 μm.

8. A thermoformable vinylidene resin composition as set forth in claim 1, wherein said epoxy plasticizer is selected from the group consisting of epoxidized soybean oil, epoxidized castor oil, epoxidized butyl linseed fatty acid ester, epoxidized methyl stearate, epoxidized butyl stearate and epoxidized octyl stearate.

9. A thermoformable vinylidene chloride resin composition as set forth in claim 1, wherein said ethylene/vinyl acetate copolymer has an ethylene content of 50 to 95% by weight, a vinyl acetate content of 5 to 50% by weight and a melt flow rate (MFR) of 0.2 to 20 g/10 min.

* * * * *